United States Patent Office 2,967,345
Patented Jan. 10, 1961

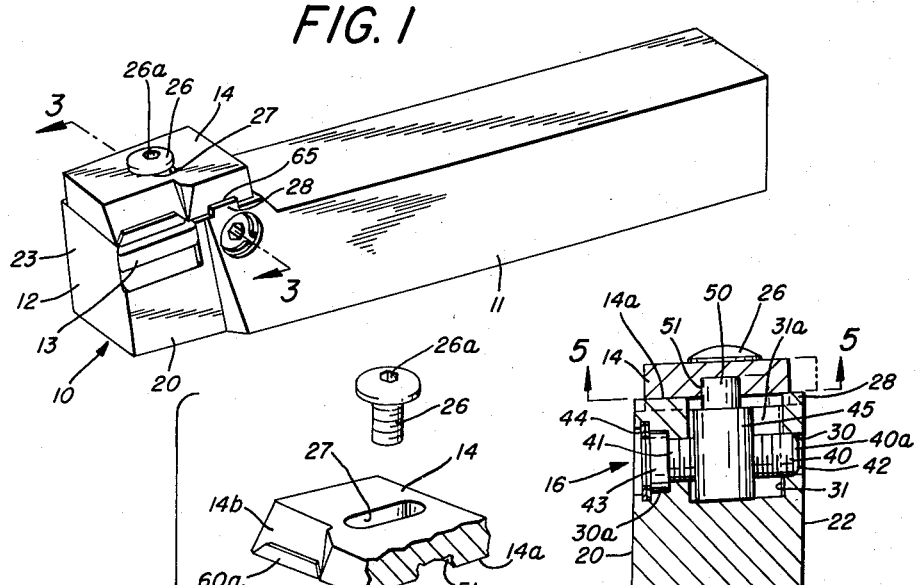
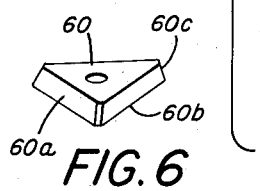
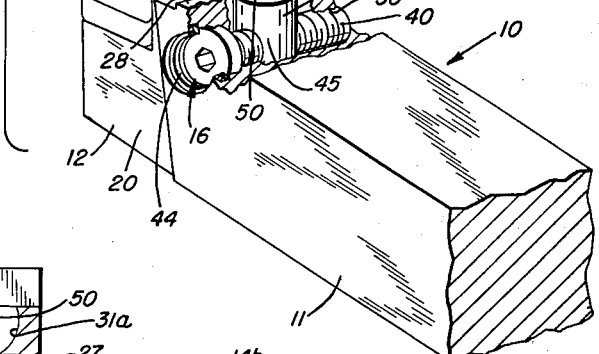
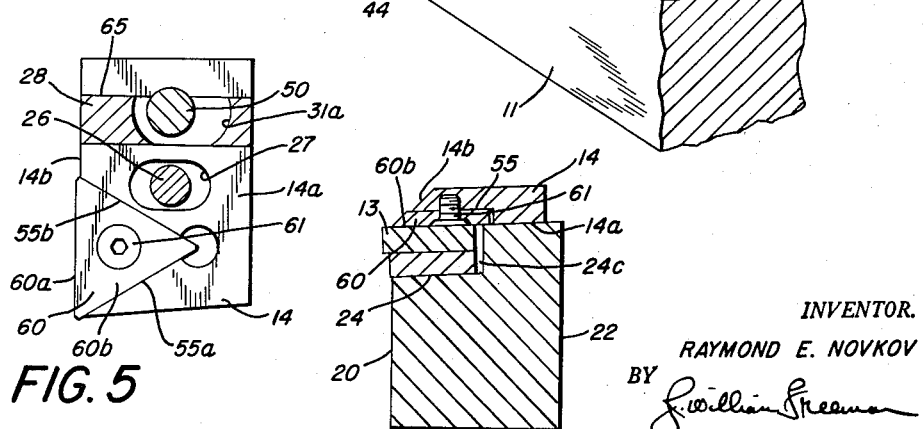

2,967,345

ADJUSTABLE CHIP BREAKER

Raymond E. Novkov, Akron, Ohio, assignor to Manchester Machine & Tool Company, Akron, Ohio, a corporation of Ohio Filed Oct. 8, 1958, Ser. No. 766,120

5 Claims. (Cl. 29—96)

This invention relates to the art of cutting tools and in particular has reference to the adjustment of chip-controlling elements that are normally employed in association with such cutting tools.

In the prior art of cutting tools, it has long been known that the chip that is cut from a revolving stock can be controlled as to size and length by use of a chip breaker. Normally, chip breakers of this type include a wear surface that is inclined to the cutting edge so that the chip will, in effect, roll up the inclined surface to form into a spiral that is easily removed.

In the art of chip breaking, it has been found that the perfect chip will resemble a figure 9 so as to have one complete curl provided in the same before breaking of the chip. While it is entirely possible to employ chip breakers of the known prior art in machining operations involving continuous operation on the article, it has been found that in many cases where the cutting tool is repetitively employed on successive pieces of stock, that the hardness or brittleness of the stock will change from piece to piece with the result that it frequently happens that the chip formation will also change during the machining operation.

The above condition can result in a detrimental operation of the cutting tool since a chip that is too long in nature is disadvantageous, while a chip that breaks off too quickly, so as to be extremely short, is also disadvantageous.

In the prior art, when a situation of the above described type has been encountered, it has been found necessary to stop the machine and reset the angle, or distance, of the chip breaker, with this normally being accomplished by loosening the screws that retain the same in place, followed by repositioning of the device so as to cause a different type of chip to be created.

It is, of course, manifest that the foregoing type of adjustment is, at best, time consuming and, accordingly, costly. Additionally, this prior-art method has the disadvantage that the same can only accomplish the desired result by "cut-and-try" methods, with the result that, even upon resetting of the chip breaker angle, the chip created may not be satisfactory, with the result that one or more additional resetting attempts must be made before proper accuracy is obtained.

In copending application, Serial Number 688,306, filed October 4, 1957, by Raymond E. Novkov, there was provided a cutting tool that featured a chip breaker that was rotatably journaled on the tool body per se, with means being provided to facilitate rotation of the chip breaker element relatively of the tool body during the cutting operation. In this manner the position of the chip breaker could be adjusted from piece to piece during operation of the tool so that a constantly uniform type of chip could be obtained regardless of the consistency of the stock that was encountered.

While a chip breaking device of this general characteristic has been found to be satisfactorily operative, the same has been disadvantageous in that the method of rotating the chip breaker was relatively expensive, with the result that the use was avoided wherever possible. Specifically, in the above reference to copending application, rotational or relative movement of the chip breaking element with respect to the tool was facilitated by worm-gear type of connection, with the chip breaking element having a pinion that is journaled in the body, with the pinion meshing with a worm gear so as to effectuate rotation around a given point.

In this regard, it was frequently found that, in addition to being costly, the above type of arrangement was susceptible to clogging, with the result that the tool had to be frequently disassembled for cleaning purposes.

In copending application, Serial No. 736,361, filed May 19, 1958, by Raymond E. Novkov, there was disclosed an improved type of chip breaker that obviated certain of the aforementioned disadvantages of the prior art by providing a thread-and-block type of advancing mechanism for effectuating shifting of the chip breaking element. Specifically, the device employed a pin member that projected from a block rotatably journaled about the tool holder, with the block being disposed in ways so that upon rotation of the cylindrical member, the block and pin would advance axially thereof to effectuate a shifting of the chip breaker element.

While this improved shifting mechanism has greatly enhanced the usability of the above device, it has been found that the same in no way enhances the overall life of the chip breaker element itself, with the result that the replacement of the chip breaker element has become an important factor due to the necessity of contouring the same to permit correct reception of the same on the tool holder.

In this regard, it has been found that the frontal surface of the chip breaking element is most susceptible to wear; and accordingly, it has been discovered that if the normal frontal edge thereof is undercut and provided with a high-wear type of replaceable insert, the overall life of the chip breaker will be greatly enhanced. Additionally, the substitution of a harder material in this critical wear region has resulted in a further advantage in that the component parts can be arranged so that the bit is retained in place in its seat principally by the hardened insert. In this fashion, a lesser area of contact occurs between the clamping element and the bit; and thus, a lesser amount of rotational force is required to overcome the frictional contact and move the clamping member and chip breaking member relatively of the bit, while still serving to retain the same in place within its seat. Even further, the use of bolts to secure the insert in place eliminates the possibility of loss thereof during changing of the cutting bit for example.

In addition, it has been further found that, while a way type of guiding arrangement can be provided for use in straight line operations, a more efficient and satisfactory result will be obtained if the combined chip breaker and clamping element is moved through its straight line path of movement by a rib and groove type of connection. This is specifically true because of the fact that the transversely extending rib prevents rotationally shifting of the chip breaker during use and further prevents movement of the chip breaker away from a single way type of construction as shown in the above referred to copending application.

Accordingly, production of an improved type of chip breaker employing the above features becomes the principal object of this invention, with other objects of this invention becoming more apparent upon reading of the brief specification, considered and interpreted in the light of the accompanying drawings.

Of the drawings:

Figure 1 is a perspective view of the improved chip breaking device.

Figure 2 is a perspective view taken from a different point and being partly broken away and in section to show the internal construction of the device.

Figure 3 is a vertical section taken on the lines 3, 3 of Figure 1.

Figure 4 is a vertical section taken on the lines 4, 4 of Figure 2.

Figure 5 is a horizontal section taken on the lines 5, 5 of Figure 3.

Figure 6 is a perspective view of the chip breaking insert.

Referring now to the drawings and in particular to Figure 1 thereof, it will be seen that the improved tool, generally designated by the numeral 10, includes a shank portion 11 and a head portion 12, with the head portion 12 being contoured for reception of one or more cutting bits 13 and a combination clamping and chip breaking element 14, and with the combination clamping and chip breaking element 14 being movable between the full and chain dotted line positions of Figure 3 upon operation of adjustment means 16, as will hereinafter be described.

Considering first the structure of the head portion 12, it will be seen that the same includes a front face 20, a top face 21 and a rear face 22 (see Figure 3) that each terminates at one end thereof at an end face 23 as is clearly shown in Figure 1 of the drawings. In this regard and referring next to Figure 2, a seat 24, having convergent sides 24a and 24b, is shown defined by the front, top and end surfaces 20, 21 and 23 of head 12 so as to define a seat or pocket within which the cutting bit 13 may be received, with both the cutting bit 13 and the seat 24 being illustrated in the preferred embodiment of the invention as being triangular in plan so as to facilitate the use of a six side cutting bit of the type shown in the drawings. In this regard, the usual clearance hole 24c is preferably provided at the apex of the triangularly shaped pocket 24 for the purpose of providing clearance in this regard.

For the purpose of shiftably mounting the combination clamping and chip breaker element 14 in coplanar relationship with top surface 21, the same (top surface 21) is provided with a tapped aperture that is spaced inwardly from the end surface 23 so as to receive therein the threaded end of a bolt 26, with this bolt 26 having its upper shank portion disposed within a slot 27 that is provided in a combination clamping and chip breaking element 14, as indicated in Figures 1, 3 and 5 of the drawings. In this manner, backing off of the screw 26 will permit release of the coplanar engagement between the combination clamping and chip breaking element 14 and top surface 21 so as to permit the removal of the cutting bit 13 from seat 24 for sharpening or other usual purposes upon removal of bolt 26. If desired, the construction and threading arrangement of the bolt 26 may be such that the same may have an integral flange that will cause the combination clamping and chip breaking element 14 to move away from face 21 upon counter-clockwise movement (Figures 1 and 2) of the bolt 26, as by inserting a wrench in opening 26a thereof. Preferably, however, a conventional bolt is employed so as to cause clamping of the bit between combination clamping and chip breaking element 14 and pocket 24 upon drawing up of the same.

Referring next to Figure 2 of the drawings, it will be further seen that the face 21 is further provided with a transversely extending raised rib portion 28 that extends transversely thereof between the opposed planar surfaces 20 and 22 for coaction with the combination clamping and chip breaker element 14, as will hereinafter be described. Additionally, it will be seen from Figures 2 and 3 of the drawings that the head portion 12 is further provided with a transverse bore 30 that interconnects front and rear surfaces 20 and 22 and which has the central portion thereof defined by an enlarged opening 31; the arrangement being such that the enlarged opening 31 will open into top surface 21 to permit positioning and withdrawal of the adjustment means, as will now be described.

In this regard and considering next the structure of the adjustment means 16 per se, it will be seen that the same includes a threaded member 40 having its axial ends 41 and 42 loosely journaled within the opposed portions of bore 30 so that a head portion 43 thereof can be retained against counter-bore 30a of bore 30 by use of the conventional retaining rings 44, 44. In this manner, the bolt 40 will merely loosely turn within the slots 30, 30 upon rotation thereof and will not move axially of bore 30. Surrounding the threaded member 40 is a block 45 that has an internally threaded bore that permits threaded reception of block 45 around the threaded shaft 40. In this regard, the external wall surfaces 45a of the block normally contact the opposed wall surfaces 31a, 31a of opening 31 and in this manner, the block 45 is prevented from rotating about the shaft 40, with the result that the block 45 will shift relatively of opening 31 upon rotation of shaft 40, with this condition being shown in full and chain-dotted lines in Figure 3 of the drawings. To the end of imparting shifting movement to the combination clamping and chip breaking element 14, the block 45 further includes a projecting pin 50 that is received, as best shown in Figure 3, within an appropriate undercut 51 that is defined by the undersurface 14a of combination clamping and chip breaking element 14.

In addition to the aforementioned component parts and referring particularly to Figure 5, the surface 14a of combination clamping and chip breaking element 14 is provided with an undercut pocket 55, preferably of triangular configuration so as to be defined by convergent wall sections 55a and 55b. Received within this pocket is an appropriately contoured, hardened chip breaker element member, generally indicated by the numeral 60, with this member 60 preferably projecting slightly beyond the front edge surface 14b of the chip breaker so as to serve as a wear surface for the frontal region of the chip breaker. Also, and as shown in Figures 4 and 5, the chip breaker 60 is preferably detachably attached with respect to pocket 55 by use of a counter-sunk bolt 61; and in this regard, it is to be understood that the invention contemplates that the frontal edge 60a of the insert can be either aligned with, recessed with respect to, or projecting beyond the frontal edge surface 14b of the combination clamping and chip breaking element 14. Additionally, it is also to be understood that the surface 60b of the insert could also project, as shown in Figure 4, beyond the surface 14a so as to permit the surface 60b to engage the bit 13. It is also to be understood that a flush or recessed arrangement could also be employed in this regard. Also and as best shown in Figures 1 and 3, the combination clamping and chip breaking element 14 further includes a transversely extending groove 65 that coacts with the raised rib 28, as clearly shown in Figure 1, to permit sliding movement of the combination clamping and chip breaking element 14 transversely of the head 12.

In use or operation of the improved chip breaker, it will first be assumed that the component parts have been assembled as indicated in the drawings, with the chip breaking insert 60 first having been positioned in pocket 55 and secured thereto by bolt 61, as shown in Figures 4 and 5. With the chip breaker thus assembled, the same can be positioned so that the pin 50 is received in slot 51 and at this time, the bolt 26 may be turned so that a light frictional contact is created between the bit 13 and the chip breaker 60, with the preferred embodiment of the invention contemplating that the contact be one of coplanar engagement between the surfaces 60b and 13a of inserts 60 and 13 respectively. In this condition, upon rotation of the bolt 40, as by positioning of a turning tool slot 40a, the pin 50 will be shifted transversely of surface 21, with the result that a corresponding shifting of the combination clamping and chip breaking element 14 will occur. In this regard, it is to be understood that in normal instances, it will not be necessary to adjust the bolt 26 to effectuate such shifting, due to the fact that the shifting force imparted to element 14 by pin 51 can normally overcome any frictional contact that may exist between the head of the bolt 26 and the element 14. However, in severe instances, it may be necessary to first slightly back off the screw 26 before rotating the threaded member 40.

If it is desired to replace the insert 13, it is merely necessary that the bolt 26 be loosened, at which time the insert can be withdrawn transversely of the pocket and turned to expose a new cutting edge. Similarly, if the insert 60 becomes damaged, it is merely necessary that combination clamping and chip breaking element 14 be removed, followed by removal of screw 61, at which time the insert 60 can be freely removed and turned within pocket 55 to present a new wear surface. In this regard, the edges of the insert 60 are preferably tapered as at 60c so as to present an inclined surface, as shown in Figure 1 of the drawings. It accordingly follows that in such instances, the walls 55a and 55b would be complementary tapered so as to permit proper setting of bit 60 in pocket 55.

It will be seen from the foregoing how there has been provided a new and improved type of adjustable chip breaker having improved wearing properties has been provided. It has been shown how the chip breaking surfaces can be adjusted with respect to the cutting edge of the tool without the need for touching the same; and accordingly, it is manifest that applicant's improved tool can be adjusted while hot because of this feature.

While a full and complete disclosure of this invention has been set forth in accordance with the dictates of the patent statutes, it is not intended that the application be so limited. Accordingly, where appropriate different materials or shapes may be substituted without the exercise of invention. As a representative example, it is to be known that surface 21, for example, could be disposed in two different planes on opposite sides of rib 28. In this fashion, the combination clamping and chip breaking element 14 could be fulcrumed on rib 28 so that a greater clamping action would occur.

Accordingly, modifications of the invention may be resorted to without departing from the spirit herein or the scope of the appended claims.

This application is a continuation-in-part of copending application, Serial No. 688,306, filed October 4, 1957 by Raymond E. Novkov and is also a continuation-in-part of copending application, Serial No. 736,361, filed May 19, 1958 by Raymond E. Novkov, now Patent No. 2,937,432 issued May 24, 1960.

What is claimed is:

1. A cutting tool of the character described, comprising; a tool holder having front and top planar surfaces that are undercut in localized regions to define a tool pocket opening into said surfaces; a tool bit received in said tool pocket and having a cutting edge projecting beyond the front surface of said body; a clamping member secured to said body and having a bottom surface overlying said top surface of said body in substantial parallelism therewith, said clamping member also having a front edge surface that overlies said bit adjacent the projecting portion thereof; a chip breaker having a plurality of chip engaging surfaces and being detachably connected with respect to said bottom surface of said clamping member in indexable relationship therewith; said chip breaker having one of said chip engaging surfaces frictionally contacting said bit adjacent said cutting edge, whereby said bit is retained in said pocket; said chip breaker being supported adjacent its point of connection with said clamping member against chip breaking forces received during cutting; and shifting means rotatably carried by said body at a spaced distance from said top surface and moving said clamping member and said chip breaker as a unit towards and from said cutting edge of said bit upon rotation of said means.

2. The device of claim 1 further characterized by the presence of guide means carried by said holder for guiding said clamping and chip breaker members in a straight line path of movement upon operation of said shifting means.

3. The device of claim 1 further characterized by the presence of guide means carried by said holder for guiding said clamping and chip breaker members in a straight line path of movement upon operation of said shifting means, said guide means including a groove and rib connection between said clamping member and said top surface of said body.

4. A cutting tool of the character described, comprising; a tool holder having top and front surfaces that are undercut to define a tool seat opening into said surfaces; a cutting bit received in said tool seat; a clamping element movably mounted on said tool holder and having a bottom surface overlying said bit in substantially parallel relationship therewith; a chip breaker seat provided on said bottom surface of said clamping element; a chip breaker element detachably secured in said chip breaker seat of said clamping member and having a front edge surface that frictionally contacts said bit, whereby the same is retained in said pocket; a pin member carried in said tool holder and projecting beyond said top surface thereof and mechanically interlocking with said clamping member; and reciprocable means carried in said tool holder and engageable with said pin member for reciprocating said pin transversely of said top surface of said holder, whereby a corresponding reciprocation of said chip breaker and said clamping element relatively of said top surface of said tool holder will occur.

5. The device of claim 4 further characterized by the fact that said chip breaker seat and said chip breaker element received therein are triangular in configuration.

References Cited in the file of this patent

UNITED STATES PATENTS

| | | |
|---|---|---|
| 2,270,387 | Spector | Jan. 20, 1942 |
| 2,382,911 | Pringle | Aug. 14, 1945 |
| 2,791,825 | Greenleaf | May 14, 1957 |
| 2,799,079 | Brigner | July 16, 1957 |
| 2,883,737 | Wilson | Apr. 28, 1959 |
| 2,897,580 | Huber | Aug. 4, 1959 |
| 2,903,781 | Hudson | Sept. 15, 1959 |

FOREIGN PATENTS

| | | |
|---|---|---|
| 1,164,677 | France | May 19, 1958 |
| 968,404 | France | Apr. 19, 1950 |
| 989,307 | France | May 23, 1951 |
| 60,931 | France | Aug. 11, 1954 |
| 989,306 | France | May 23, 1951 |
| 1,084,955 | France | July 21, 1954 |
| 1,140,048 | France | Feb. 25, 1957 |